US012639798B2

(12) United States Patent
Lenor et al.

(10) Patent No.: US 12,639,798 B2
(45) Date of Patent: May 26, 2026

(54) METHOD FOR DETECTING IMAGING DEGRADATION OF AN IMAGING SENSOR

(71) Applicant: Robert Bosch GmbH, Stuttgart (DE)

(72) Inventors: Stephan Lenor, Gerlingen (DE); Andreas Scharf, Stuttgart (DE); Christian Wolf, Walddorfhaeslach (DE); Gergo Feher, Teglas (HU); Zsolt Vizi, Szeged (HU)

(73) Assignee: Robert Bosch GmbH, Stuttgart (DE)

( * ) Notice: Subject to any disclaimer, the term of this patent is extended or adjusted under 35 U.S.C. 154(b) by 520 days.

(21) Appl. No.: 18/006,071

(22) PCT Filed: Jul. 22, 2021

(86) PCT No.: PCT/EP2021/070491
§ 371 (c)(1),
(2) Date: Jan. 19, 2023

(87) PCT Pub. No.: WO2022/018191
PCT Pub. Date: Jan. 27, 2022

(65) Prior Publication Data
US 2023/0281777 A1     Sep. 7, 2023

(30) Foreign Application Priority Data

Jul. 22, 2020     (DE) ..................... 10 2020 209 198.6

(51) Int. Cl.
*G06T 7/00*          (2017.01)
*B60W 50/02*      (2012.01)
(Continued)

(52) U.S. Cl.
CPC ....... *G06T 7/0002* (2013.01); *B60W 50/0205* (2013.01); *B60W 50/14* (2013.01);
(Continued)

(58) Field of Classification Search
None
See application file for complete search history.

(56) References Cited

U.S. PATENT DOCUMENTS

2009/0220152 A1     9/2009   Tiwari et al.
2019/0025773 A1     1/2019   Yang et al.
(Continued)

FOREIGN PATENT DOCUMENTS

CN          108335293 A       7/2018
CN          111194458 A       5/2020
(Continued)

OTHER PUBLICATIONS

International Search Report corresponding to PCT Application No. PCT/EP2021/070491, mailed Oct. 29, 2021 (German and English language document) (6 pages).

*Primary Examiner* — Leon Viet Q Nguyen
(74) *Attorney, Agent, or Firm* — Maginot, Moore & Beck LLP

(57) ABSTRACT
A method for detecting imaging degradation of an imaging sensor includes (i) providing an image of a surrounding area, said image being generated by the imaging sensor; (ii) detecting imaging degradation for each sub-image of a plurality of sub-images of the image using a neural network trained for this purpose; and (iii) detecting the imaging degradation of the sensor, said imaging degradation exhibiting the ratio of the number of sub-images of the image with detected degradation to the plurality of sub-images.

13 Claims, 3 Drawing Sheets

(51) Int. Cl.

| | |
|---|---|
| *B60W 50/14* | (2020.01) |
| *B60W 60/00* | (2020.01) |
| *G06V 10/774* | (2022.01) |
| *G06V 10/82* | (2022.01) |
| *G06V 20/56* | (2022.01) |
| *G06V 20/70* | (2022.01) |

(52) U.S. Cl.
CPC ......... *B60W 60/001* (2020.02); *G06V 10/774* (2022.01); *G06V 10/82* (2022.01); *G06V 20/56* (2022.01); *G06V 20/70* (2022.01); *G06T 2207/20021* (2013.01); *G06T 2207/20081* (2013.01); *G06T 2207/20084* (2013.01); *G06T 2207/30168* (2013.01); *G06T 2207/30252* (2013.01)

(56) References Cited

U.S. PATENT DOCUMENTS

| | | | | |
|---|---|---|---|---|
| 2019/0385025 | A1* | 12/2019 | McMichael | ............ G06V 10/82 |
| 2020/0090322 | A1 | 3/2020 | Seo et al. | |
| 2021/0117694 | A1* | 4/2021 | Luk-Zilberman | ...... B60K 35/28 |
| 2021/0394774 | A1* | 12/2021 | Zhang | .............. B60W 60/0025 |
| 2022/0222855 | A1* | 7/2022 | Valtonen | ................... G06T 7/62 |

FOREIGN PATENT DOCUMENTS

| | | | |
|---|---|---|---|
| DE | 10 2008 001 679 A1 | 11/2009 | |
| EP | 3 489 892 A1 | 5/2019 | |
| WO | WO2022/112213 A2 * | 4/2020 | |
| WO | WO2020/112213 A2 * | 6/2020 | |

* cited by examiner

METHOD FOR DETECTING IMAGING DEGRADATION OF AN IMAGING SENSOR

This application is a 35 U.S.C. § 371 National Stage Application of PCT/EP2021/070491, filed on Jul. 22, 2021, which claims the benefit of priority to Serial No. DE 10 2020 209 198.6, filed on Jul. 22, 2020 in Germany, the disclosures of which are incorporated herein by reference in their entirety.

BACKGROUND

The automation of driving is accompanied by equipping vehicles with ever more extensive and more powerful sensor systems for capturing the surroundings. For example, in autonomous driving, but also increasingly in driver assistance systems (levels 2-3), it is necessary to ensure as high an availability of the sensors and of the entire system as possible.

An imaging sensor can be degraded by a wide variety of disturbances of the recording path, for example due to dirt on the camera lens or the preceding windshield, or damage to the camera or due to other environmental influences, such as rain, fog, snow or spray.

For capturing representations of the surroundings by means of imaging sensors, sufficiently clear images of the imaging sensors are particularly important in order to ensure availability of the sensors and thus the safety of the overall system.

SUMMARY

In the interpretation of the sensor data, machine learning methods are used for classification tasks and detection tasks. In the video field, for example, convolutional neural networks are used to classify or detect objects.

These networks are unable to ensure their functionality during degraded or restricted operation without very special training. In practice, degraded images (dirt, rain, etc.) lead to a flawed system output not only with convolutional networks but also with traditional computer vision algorithms.

For recognizing the surroundings it is therefore necessary to know the degradation status of the sensor system or of an entire system in order to be able to respond early to a degradation.

According to aspects of the disclosure, a method for determining an imaging degradation of an imaging sensor, a method for training a neural network for determining a degradation, a method for providing a control signal, a control device, a computer program and a machine-readable storage medium, according to the features of the independent claims are proposed. Advantageous embodiments are the subject matter of the dependent claims and the following description.

According to one aspect, a method for determining an imaging degradation of an imaging sensor is proposed, the method comprising the following steps:

In a step of the method, an image of a surroundings is provided, said image having been generated by the imaging sensor. In a further step, a degradation for each sub-image of a plurality of sub-images of the image is determined by means of a neural network trained for this purpose. In a further step, the imaging degradation of the sensor is determined, said imaging degradation exhibiting a ratio of a number of sub-images of the image with determined degradation to the plurality of sub-images.

Throughout this description of the disclosure, the sequence of method steps is shown in such a way that the method is easy to understand. However, the person skilled in the art will recognize that many of the method steps can also be run through in a different order and result in the same or a corresponding result. In this sense, the sequence of the method steps can be changed accordingly. Some features are provided with numerals to improve readability or to make the assignment clearer, but this does not imply a presence of particular features.

The architecture of such an artificial neural network may be a convolutional network. Except for the input layer, the different convolutional layers consist of neurons that are subject to a nonlinear activation function. A network that consists only of such convolutional layers is called a fully convolutional neural network.

In neural networks, a signal at a connection of artificial neurons may be a real number and the output of an artificial neuron is calculated by a nonlinear function of the sum of its inputs. The connections of the artificial neurons typically have a weighting that is adjusted with progressive learning. The weighting increases or reduces the strength of the signal at a connection. Artificial neurons can have a threshold so that a signal is output only if the total signal exceeds this threshold.

A multiplicity of artificial neurons are typically grouped in layers. Different layers may carry out different types of transformations for their inputs. Signals travel, possibly after passing through the layers multiple times, from the first layer, the input layer, to the last layer, the output layer.

Such neural networks must be trained for their specific task. In the process, each neuron of the corresponding architecture of the neural network receives, for example, a random initial weighting. The input data are then input into the network, and each neuron can weight the input signals with its weighting and transmits the result further to the neurons of the next layer. The overall result is then provided at the output layer.

The magnitude of the error can be calculated as well as the proportion that each neuron had in this error, in order to then change the weighting of each neuron in the direction that minimizes the error. Runs, renewed measurements of the error and adjustment of the weightings then take place recursively until an error criterion is fulfilled.

Such an error criterion may, for example, be the classification error in a test data set, or also a current value of a loss function, for example in a training data set. Alternatively or additionally, the error criterion may relate to a stop criterion as a step in which during training an overfitting would start or the available time for training have elapsed.

The image of the surroundings may be provided in digital form as an input signal to the trained neural network.

A plurality of sub-images of the image of the surroundings may comprise a small number of sub-images, such as two or three sub-images; the plurality may also comprise 100 sub-images or the image may have an even much higher number of sub-images. A size of such a sub-image may be selected as desired according to the requirements; for example, a sub-image may have a size of 320×320 pixels.

The degradation of the imaging of the imaging sensor, or the degradation of each sub-image of the image, may be caused by impairments which the imaging sensor has experienced in particular during operation, such as rain, snow, scratches, fogging, dust, fog, glare due to, for example, a low sun, leaves and/or other contaminants.

In other words, in this method, the imaging degradation of the imaging sensor is recognized by the image of the surroundings being subdivided into a plurality of sub-images and a relevant degradation being determined with a trained convolutional network for each sub-image. The imaging degradation of the imaging sensor can then be determined with the aid of the determined degradation of the sub-images. In this case, the imaging degradation can, in particular, be by a ratio of a number of sub-images of the image with degradation to a number of sub-images with no degradation.

With this method for determining the imaging degradation of an imaging sensor, other common video algorithms recognizing objects of the surroundings, said algorithms being based, for example, on convolutional neural networks, can also be supported and their results verified or falsified since video algorithms recognize objects in the surroundings, said objects being derived from sub-images of the image of the surroundings, said sub-images being too degraded for reliable object recognition. Such objects that have been detected in degraded sub-images can then be discarded, for example.

Further advantageously, a still sufficient partial functionality of the imaging sensor can be defined with this method so that the imaging sensor can continue to be used for recognizing objects in the surroundings despite partial restrictions. This results in a higher availability of the system for object recognition or of the imaging sensor.

If the imaging degradation has exceeded a certain predefined extent, the system can be switched off safely, in good time and in a controlled manner in order to ensure a sufficiently reliable operation for its particular use. By means of the information about the imaging degradation of the imaging sensor, which information can be derived from the method, it is additionally possible to trigger hold-off functions, such as cleaning functions, in order to maintain or restore an availability of the imaging sensor or of an overall system for object recognition.

The imaging degradation or sensor blindness of the imaging sensor can be determined with this method.

According to one aspect, it is proposed that the determined imaging degradation comprises a localization of the degraded sub-images in the relevant image.

Since in the method the imaging degradation of an imaging sensor is determined in each case for a sub-image of a plurality of sub-images of the image, the relevant sub-image can be used to determine the location in the image in which the degradation was determined.

According to one aspect, it is proposed that the provided image is subdivided into a plurality of sub-images of the image in order to determine the degradation for each sub-image of the plurality of sub-images by means of the neural network trained for this purpose.

Since the image is subdivided into a plurality of sub-images, a correspondingly trained neural network can advantageously be used for determining the degradation of the relevant sub-image without the trained neural network being configured to subdivide the image into sub-images.

According to one aspect, it is proposed that the neural network is a convolutional neural network and the convolutional neural network is configured to determine the degradation for each sub-image of the plurality of sub-images of the image of the surroundings.

Since the convolutional neural network is configured to determine the degradation of sub-images of a plurality of sub-images of the image with respect to the degradation, it is not necessary to subdivide the image into sub-images beforehand, as a result of which fewer resources with respect to hardware or with respect to a processing time are needed to carry out the method.

In other words, the convolutional network is trained on sub-images and thus also knows only sub-images. However, it still functions with an overall image that consists of a plurality of sub-images. The network subdivides the input image itself into sub-images. At the same time, it classifies and localizes them.

In this case, a convolutional neural network suitable for this method can have exclusively convolutional layers and max-pooling layers. Wherein the last layer of the convolutional neural network is an output layer that generates and provides a corresponding classification result of the convolutional neural network by means of convolution operations.

According to one aspect, it is proposed that the convolutional neural network in a penultimate convolutional layer has a kernel size and a step size corresponding to an input size of the last convolutional layer and the last convolutional layer has a zero-padding strategy.

That is to say, in other words, the kernel size and the step size of the penultimate convolutional layer that is directly adjacent to the output layer correspond exactly to the remaining input size for the penultimate convolutional layer. As a result, at the input of the convolutional neural network in the feature space, the sub-images of the image are correctly assigned to the relevant determined degradation in the output layer.

With this overall structure, the convolutional neural network can subdivide the image into the plurality of sub-images and in each case determine a degradation accordingly for the respective sub-images.

EXAMPLE

For an input feature map of: [5×5×Number_features], the penultimate convolutional layer must be parametrized as follows:

Convolution2d (kernel size=[5.5], step size=5, padding="yes")

With such a convolutional neural network (fully convolutional neural network), a sub-image of an image, i.e., a sub-image that is smaller than an image representing the surroundings, can always be convoluted by means of a first number of convolutional layers and a second number of max pooling layers to be smaller and smaller until only one input size of [1×1×number_features] is left for the output layer or the classification layer, said input size determining a degradation for this sub-image, i.e., a degraded sub-image or a non-degraded sub-image.

The exact arrangement, size and number of convolutional layers and max pooling layers can be designed differently. It is only relevant for the sub-image to be completely convoluted small to a size [1×1×number_resulting_features]. For all input images whose height h and width b is not a multiple of the sub-image size P, special border handling can be performed. The border pixels that do not fall into a sub-image could be ignored since they should be irrelevant or negligible, or the input image can be scaled accordingly, e.g., by zero-padding, so that height h and width b are a multiple of P. Alternatively or additionally, an image can also be suitably scaled.

Alternatively, the convolutional network could only be operated with sub-images of the patch size/sub-image size P. However, it would have to be manually ensured in this case that the input image is broken down into sub-images, which are then input into the convolutional network for degradation classification. When using the presented convolutional network, the penultimate layer would then have no effect.

According to one aspect, it is proposed that the degradation of the sub-images be determined as degraded or non-degraded by means of the neural network. In other words, the degradation can be described with two values, degraded or non-degraded. An extent of the degradation can here be determined, in particular during training of the neural network, wherein, depending on an extent of the degradation, the relevant sub-image is classified as degraded or non-degraded.

According to one aspect, it is proposed that the degradation of the sub-images be determined by means of the neural network with a plurality of degradation categories and the degradation of the relevant sub-image for determining the imaging degradation be dependent on the determined degradation category.

In this case, the degradation category can be adapted accordingly to certain requirements and can either relate to an extent of degradation and/or be attributed to a cause of the degradation, such as rain, snow, scratches, fog, glare (low sun), leaves and contamination of any kind. The result of such a degradation category, which is determined for the relevant sub-image, can then be mapped onto values of the degradation, namely degraded or non-degraded.

Alternatively or additionally, the degradation categories can also be used directly as classification output variables. The "degraded" state can then, for example, be subdivided into categories, such as: rain, snow, fog, etc.

According to one aspect, it is proposed that the imaging sensor is an optical camera and/or a video system and/or LIDAR system and/or a RADAR system and/or a time-of-flight camera.

Since this method can be trained for the relevant imaging sensor by means of the neural network, it can be adapted to the different sensor types, under the precondition of sensor-specific training data.

A method is proposed for training a neural network for determining a degradation for each sub-image of a plurality of sub-images of an image of a surroundings with a plurality of training cycles, according to any one of the methods described above, each training cycle comprising the following steps:

In one step, a ground-truth image is provided, wherein each sub-image of a plurality of sub-images of the ground-truth image is labeled with regard to a degradation of the sub-image. In a further step, the degradation of the relevant sub-image of the ground-truth image is determined with the neural network. In a further step, the neural network is adapted in order to minimize a deviation of the degradation determined with the neural network from the labeled degradation of the relevant sub-image of the ground-truth image during the determination of the degradation of the relevant sub-image of the ground-truth image.

In this case, ground-truth images are images generated by means of the relevant imaging sensor, in particular specifically for the teaching of a machine learning system, such as a neural network or a convolutional neural network, and which have been, for example, selected manually and, for example, annotated using a label guide, or generated synthetically, for example by simulation of rain, snow, etc. directly onto an image, and in which the plurality of sub-images of the ground-truth images have been labeled with regard to the degradation of the sub-images. For example, such labeling of the sub-images can take place manually, according to defined specifications for determining a degradation or classification.

This method can be used to train a neural network or a convolutional neural network, which in the methods described here can be used for determining the imaging degradation of the imaging sensor.

In this case, the image of the imaging sensor can be provided in digital form to the trained neural network as an input signal.

After the training, such a trained neural network or convolutional neural network may be used in different systems without the ground-truth images used for the training.

According to one aspect, it is proposed that the neural network is one of the convolutional neural networks described above, and the ground-truth image provided comprises at least one sub-image that is labeled with the associated degradation. Alternatively or additionally, the ground-truth image provided may comprise exactly one sub-image of a surroundings that has been labeled with the associated degradation.

Such a convolutional network (fully convolutional network) can thus be trained with individual sub-images that are labeled, wherein a degradation of sub-images in an overall image can then nevertheless be determined with such a convolutional neural network, and an assignment to different regions of the image with a plurality of sub-images can also take place. Alternatively or additionally, the convolutional neural network can also be trained with images comprising a plurality of sub-images, wherein each of the sub-images of the image is labeled.

That is to say, in other words, a convolutional neural network, as described above, can be used for the method for determining the imaging degradation of the imaging sensor, wherein the described convolutional neural network subdivides the image into a plurality of sub- images for the purpose of determining the imaging degradation and determines a degradation for a relevant sub-image. In particular, this convolutional neural network can be trained not only with individual sub-images but also with images comprising a plurality of sub-images.

A method is proposed in which, based on an imaging degradation of an imaging sensor, said imaging degradation having been determined by one of the methods described above, a control signal for controlling an at least partially automated vehicle is provided; and/or, based on the determined imaging degradation of the imaging sensor, a warning signal is provided for warning a vehicle occupant; and/or, based on the determined imaging degradation of the imaging sensor, an actuator is controlled.

The term "based on" is to be understood broadly with respect to the feature that a control signal is provided based on an imaging degradation of an imaging sensor, said imaging degradation having been determined with one of the methods described above. It is to be understood such that the determined imaging degradation of the imaging sensor is used for any determination or calculation of a control signal, which does not exclude other input variables also being used for this determination of the control signal. This applies correspondingly to the provision of a warning signal. This also applies correspondingly to the control of the actuator.

With such a method for providing a control signal, it is possible to respond differently to this imaging degeneration depending on the imaging degeneration of an imaging sensor. A transition into a safe state can thus be initiated with the method when it is used with highly automated systems. For example, this can lead to a slow stopping on the shoulder in the case of an at least partially automated vehicle.

The provision of a control signal for controlling an actuator can activate a cleaning with different intensity, for example in the presence of hold-off functions or washing functions, for example with actuators such as spray nozzles and windshield wipers for a sensor surface.

According to one aspect, a control device is specified that has an above-described neural network that has been trained according to one of the methods described above. By means of such a device, the corresponding method can be easily integrated into different systems.

It is proposed to use one of the above-described methods for determining an imaging degradation of an imaging sensor in order to determine an imaging degradation of an imaging sensor.

According to one aspect, a computer program is provided which comprises instructions which, when the computer program is executed by a computer, cause the computer to carry out one of the methods described above. Such a computer program enables the use of the described method in different systems.

A machine-readable storage medium is specified on which the above-described computer program is stored. The computer program described above is transportable by means of such a machine-readable storage medium.

BRIEF DESCRIPTION OF THE DRAWINGS

Exemplary embodiments of the disclosure are illustrated with reference to FIGS. 1 to 3 and explained in more detail below. Shown are.

DETAILED DESCRIPTION

Figure 1:
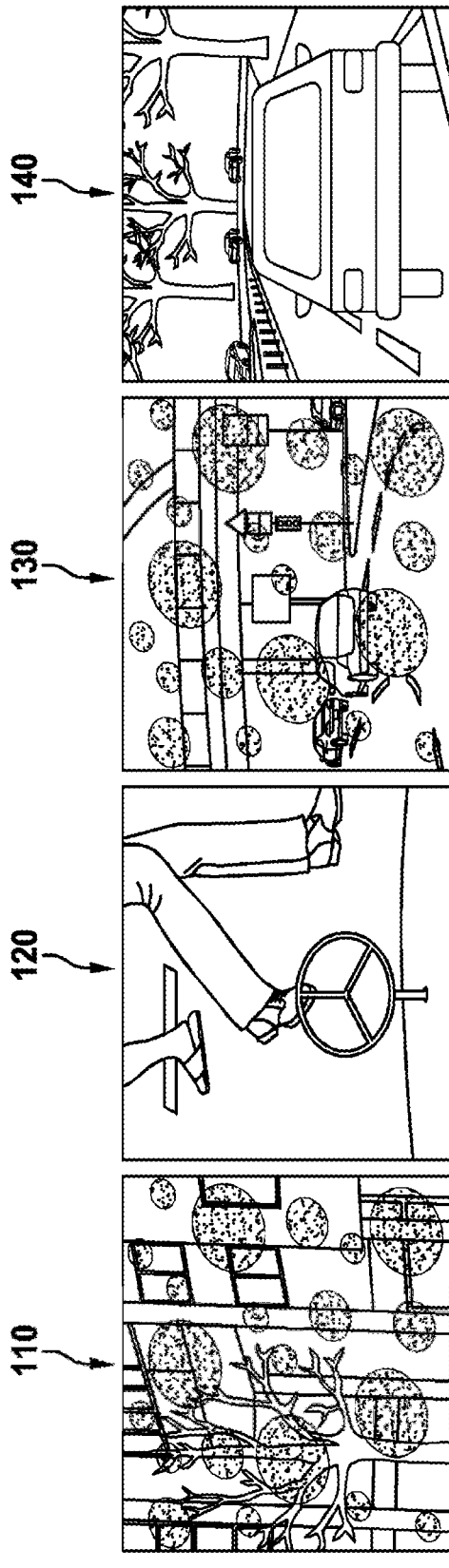
FIG. 1 degraded and non-degraded sub-images.

FIG. 1 schematically outlines the sub-images 110, 120, 130, 140 for training a convolutional neural network, of which the sub-images 110 and 130 are degraded.

Figure 2:
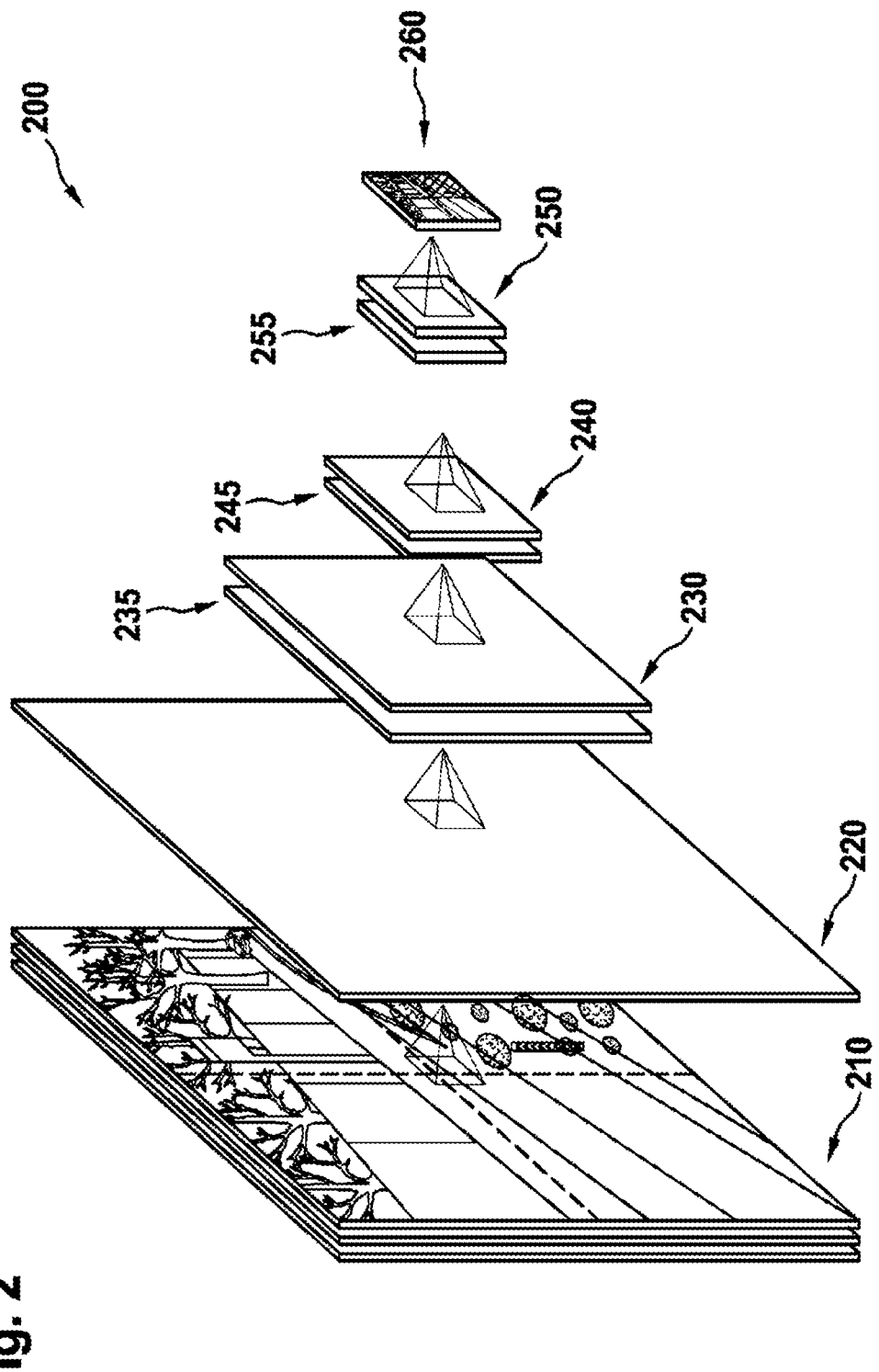
FIG. 2 a convolutional network.

FIG. 2 schematically shows a structure of a convolutional neural network 200 with an image of a surroundings 210, convolutional layers 220, 230, 240, 250 and max pooling 20 layers 235, 245, 255 as well as an output layer 260 with a degradation of the respective sub-images, said degradation having been determined with the trained convolutional neural network.

By way of example, an input image of size [1920×640×3] pixels can be provided to the convolutional neural network which has been trained with sub-images of size [320×320] pixels. A plurality of convolutional layers and pooling layers can break down the image to a size of [1×1×number_features]. By selecting 2 classes (degraded and non-degraded), an output vector of size [6×2] with the corresponding sub-image classification with regard to the degradation is now produced at the output of the network. The output corresponds to the imaging degradation.

Figure 3:
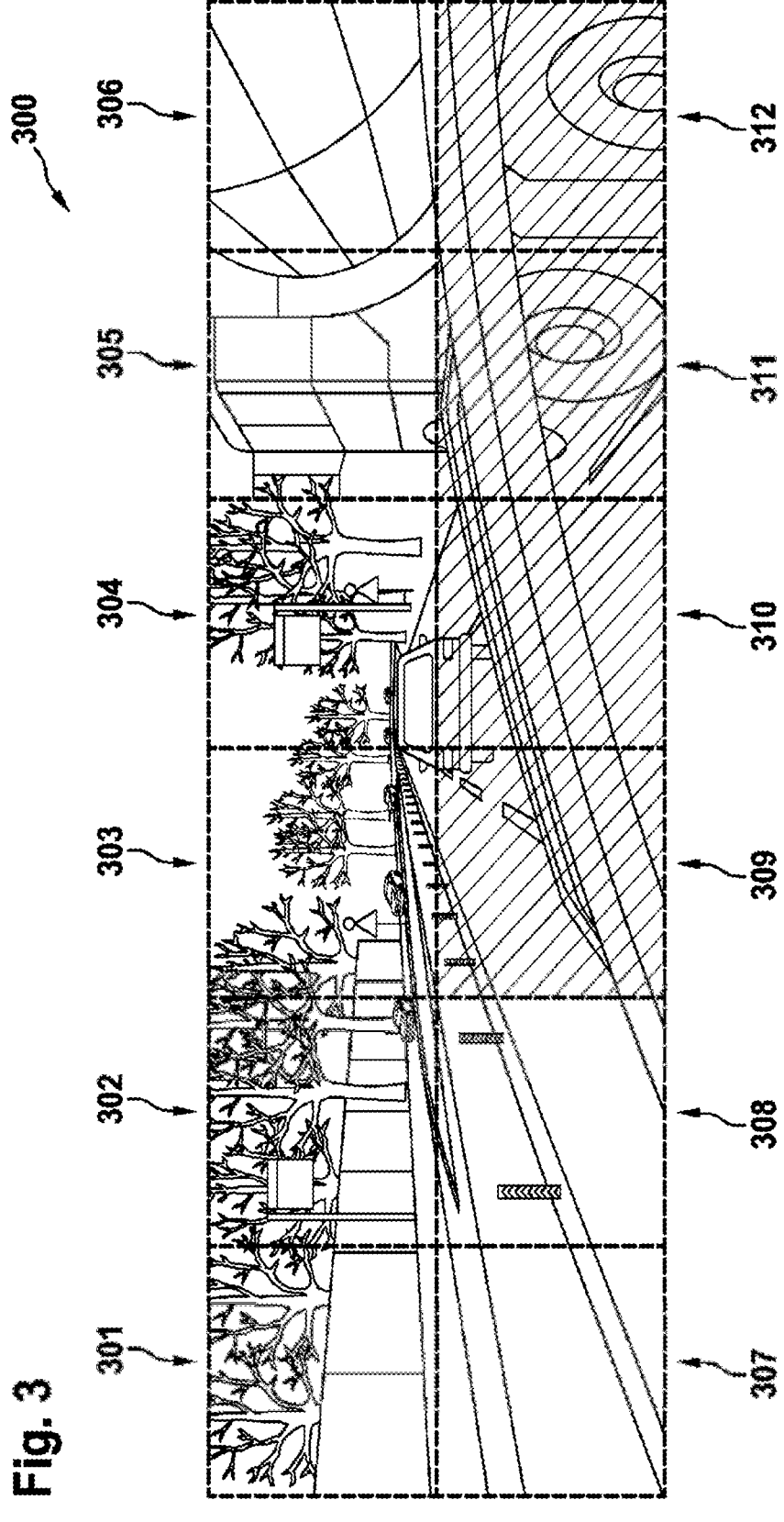
FIG. 3 an image of a surroundings, said image being subdivided into a plurality of sub-images, wherein some of the sub-images are degraded.

FIG. 3 outlines an image of a surroundings, which comprises a plurality of sub-images 310 to 312 and in which the sub-images 309 to 312 have been determined to be degraded. In these four images, the degradation can be attributed to a concealment, by a windshield wiper, of the image field of the affected sub-images 309 to 312 of the image of the surroundings.

The invention claimed is:

1. A method for determining an imaging degradation of an imaging sensor, comprising:

providing an image of a surroundings, the image having been generated by the imaging sensor;

subdividing the image of the surroundings into a plurality of sub-images, each sub-image having a same dimension;

determining a degradation for each sub-image using a trained neural network;

labeling each sub-image as degraded or non-degraded; and determining the imaging degradation of the imaging sensor as a ratio of a number of the sub-images labeled as degraded to a total number of the sub-images included in the plurality of sub-images, wherein the total number of the sub-images is twelve.

2. The method according to claim 1, wherein the imaging degradation comprises a localization of the sub-images labeled as degraded in the image of the surroundings.

3. The method according to claim 1, wherein:

the trained neural network is a convolutional neural network, and the convolutional neural network is configured to determine the degradation for each sub-image of the plurality of sub-images of the image of the surroundings.

4. The method according to claim 3, wherein the convolutional neural network in a last convolutional layer has a kernel size and a step size corresponding to an input size of the last convolutional layer and the last convolutional layer has a zero-padding strategy.

5. The method according to claim 1, wherein the sub-images labeled as degraded are labeled with a plurality of degradation categories.

6. The method according to claim 1, wherein the imaging sensor includes an optical camera, a video system, a LIDAR system, a RADAR system, and/or a time-of-flight camera.

7. The method for training a neural network for determining a degradation for each sub-image of a plurality of sub-images of an image of a surroundings with a plurality of training cycles, according to claim 1, wherein each training cycle comprises:

providing a ground-truth image, wherein each sub-image of a plurality of sub-images of the ground-truth image is labeled with regard to a degradation of the sub-image;

determining the degradation of the each sub-image of the ground-truth image with the neural network; and adapting the neural network in order to minimize a deviation of the degradation determined with the neural network from the labeled degradation of each sub-image of the ground-truth image during the determination of the degradation of each sub-image of the ground-truth image.

8. The method according to claim 7, wherein:

the neural network is a convolutional neural network; and the ground-truth image comprises (i) at least one sub-image that is labeled as degraded or non-degraded, and/or (ii) exactly one sub-image of the surroundings, the sub-image being labeled as degraded or non-degraded.

9. The method according to claim 1, wherein based on a determined imaging degradation of an imaging sensor (i) a control signal for controlling an at least partially automated vehicle is provided, (ii) a warning signal is provided for warning a vehicle occupant, and/or (iii) an actuator is controlled.

10. A control device configured to carry out a method according to claim 1.

11. Use of a method according to claim 1 for determining an imaging degradation of an imaging sensor.

12. A non-transitory machine-readable storage medium on which a computer program is stored, the computer program comprising instructions which, when the computer program is executed by a computer, cause the computer to execute the method according to claim 1.

13. A method for determining an imaging degradation of an imaging sensor, comprising:

providing an image of a surroundings, the image having been generated by the imaging sensor;

subdividing the image of the surroundings into a plurality of sub-images, each sub-image having a same dimension;

determining a degradation for each sub-image using a trained neural network;

labeling each sub-image as degraded or non-degraded; and determining the imaging degradation of the imaging sensor as a ratio of a number of the sub-images labeled as degraded to a total number of the sub-images included in the plurality of sub-images, wherein each sub-image is 320×320 pixels.

* * * * *